United States Patent [19]

Rellinger

[11] 3,715,042
[45] Feb. 6, 1973

[54] TRUCK RETRIEVER HOIST

[76] Inventor: Oscar A. Rellinger, P.O. Box 12, Helena, Ohio 43435

[22] Filed: March 23, 1971

[21] Appl. No.: 127,227

[52] U.S. Cl. ............. 214/86 A, 280/402, 280/415 A
[51] Int. Cl. ........................................... B60p 3/12
[58] Field of Search ....... 214/86 A; 280/402, 415 A, 280/423 B

[56] References Cited

UNITED STATES PATENTS

| | | | |
|---|---|---|---|
| 2,481,223 | 9/1949 | Johnson | 214/86 A |
| 2,515,833 | 7/1950 | Mueller | 214/86 A |

Primary Examiner—Albert J. Makay

[57] ABSTRACT

This invention consists of two equally spaced, parallel and horizontally disposed steel beams to which there is attached by welding a ½ inch × 32 inches diameter plate and a standard SAE kingpin, such as all standard semi-trailers are equipped with. This kingpin engages in and is held firmly to any fifth wheel that is equipped with standard fifth wheel locking device. Two equally spaced, parallel and vertically disposed steel beams extend upward from the rear end of the aforesaid horizontally disposed steel beams. The purpose of the just-mentioned beams is to act as both a guide and partial support for the steel boom whose rear end is provided with a chain for the lifting of a disabled truck or the like. The aforesaid steel boom has its front end swingably supported by steel structure extending upward from the front end of the first-mentioned steel beams of this invention. A hydraulic cylinder, located on top of the steel boom, raises and lowers the boom. A second steel boom is swingably secured at one end to the underside of the rear end of this invention. This boom is provided with a laterally disposed steel beam for the stabilizing of one end of the disabled truck once it has been lifted by the first-mentioned steel boom. The previously mentioned hydraulic cylinder receives its power from the hydraulic system of the towing tractor or the like on which this invention is mounted.

4 Claims, 9 Drawing Figures

PATENTED FEB 6 1973

3,715,042

INVENTOR
*OSCAR A. RELLINGER*

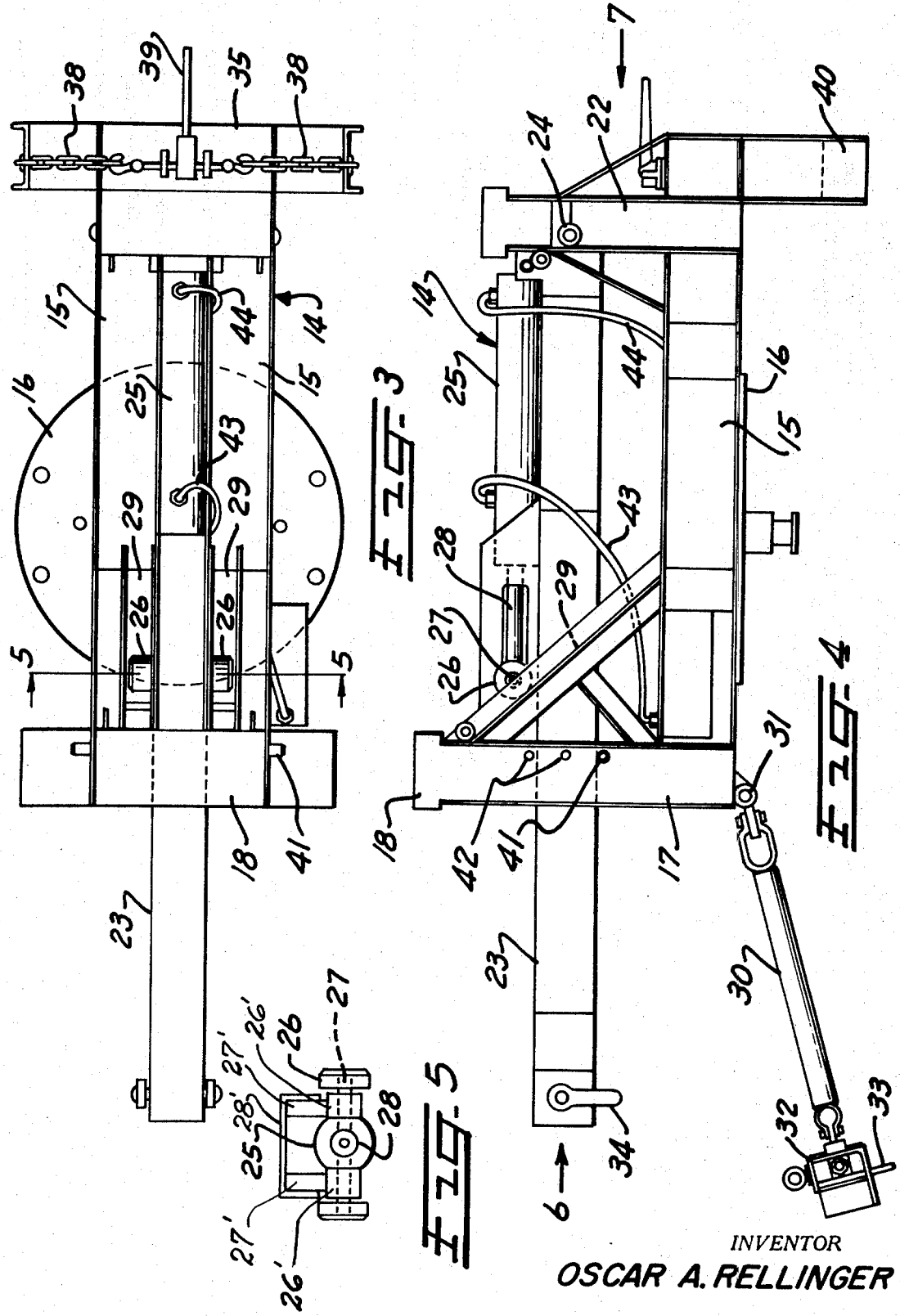

*INVENTOR*
OSCAR A. RELLINGER

3,715,042

TRUCK RETRIEVER HOIST

This invention relates to hoist; particularly, to hoist to be secured to the fifth wheel of nearly any standard semi-truck tractor, which I call a towing tractor; still more particularly, to a hoist that is portable, as will be understood on the reading of this specification and its appended claims and upon examination of the accompanying drawings.

For the benefit of those less experienced in the art, it is herein explained that while the word hoist has basically the meaning to raise aloft, lift, or pull up, in this instance it means an apparatus for raising heavy things, namely, one end of trucks or the like.

While there have been any number of different types of hoist designed and built for use by the automotive repair industry, none, so far as it is known, have ever been designed or built that are portable and can be placed in service in a matter of minutes on a vehicle for the lifting of one end of trucks or any other automotive vehicles.

It is therefore the principal object of this invention to provide a truck retriever hoist of the character herein described that is portable and can be secured to the fifth wheel of nearly any standard semi-truck tractor or the like.

Another object of this invention is to provide a truck retriever hoist of the character herein described that is constructed primarily of steel H-beams, channels, angle irons, and the like along with some machine component parts, including steel chains.

Another object of this invention is to provide a truck retriever hoist of the character herein described that is activated by a single hydraulic cylinder that is part of this novel invention and which receives its power from the hydraulic system of the semi-truck tractor on which it is placed.

Another object of this invention is to provide a truck retriever hoist of the character herein described that contains a minimum number of parts all made to withstand heavy usage in all kinds of weather with a minimum amount of maintenance.

Still another object, although not necessarily the last object of this invention, is to provide a truck retriever hoist that is heavy enough to give the desired added traction to the towing tractor for both greater stability and better riding when traveling empty to a truck or the like that is to be towed to a place for repair.

Other and further objects of this invention will no doubt be thought of by the reader of this specification and its appended claims as the reading of the same proceeds and the accompanying drawings are examined from time to time.

In the drawings:

FIG. 3 is a top view of this invention.

FIG. 4 is a side view of this invention.

FIG. 5 is a sectional view of this invention, taken substantially along line 5-5 of FIG. 3, and viewed in the direction indicated by the arrows.

In the several views of this invention, like parts are indicated by like reference numbers.

Figures 6, 7:
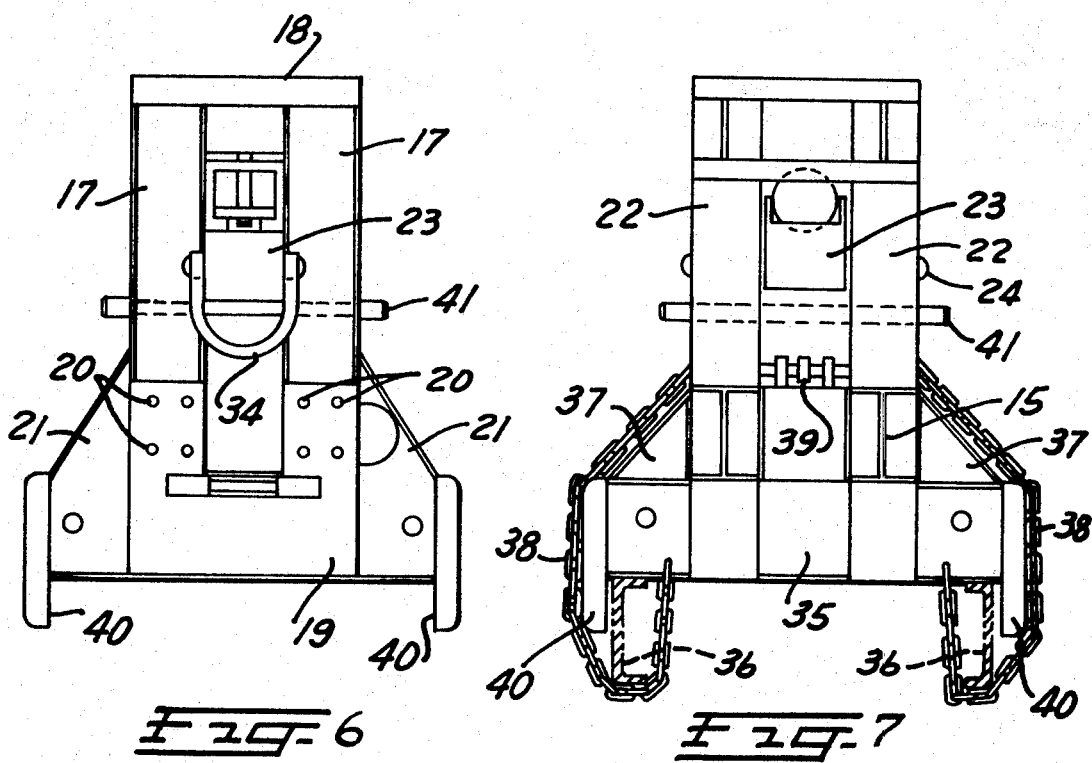
FIG. 6 is a rear view of this invention as indicated by the arrowed line and number 6 in FIG. 4. Some parts are not shown for reasons of clarity.
FIG. 7 is a front view of this invention as indicated by the arrowed line and number 7 in FIG. 4.

The reference number 14, not shown on FIGS. 5, 6, and 7 as outlined in the accompanying drawings, indicates this invention in its entirety.

Before going into the detail construction of this novel invention, attention is called to FIGS. 1, 2, 3, and 4 where it will be seen that only the invention itself is shown in solid black lines for reasons of clarity.

Directing ones attention to FIGS. 3 and 4 of the accompanying drawings it will be seen that this invention 14 consists of two equally spaced, parallel, and horizontally disposed steel beams 15 that are firmly welded to the attaching kingpin plate 16 as shown on the bottom side of hoist in FIG. 4. Two equally spaced, parallel, and vertically disposed steel beams 17 extend upward from the rear end of the aforesaid steel beams 15. A cross-beam 18 extends across and is secured to the top of the two aforesaid steel beams 17. An end plate 19 is suitably secured by welding or any other means to the lower and rear end of the aforesaid beams 17 in order to provide additional strength and stability to this part of the invention. Openings 20 are made in the aforesaid end plate 19 for the mounting of running lights, the openings being clearly seen in FIG. 6 of the drawings. Here it is also seen that the lower end of each beam 17 is further strengthened by means of a hollow steel box 21. The front end of the invention is provided with two equally spaced and upwardly extending steel beams 22 that provide swingable support for the front end of the hollow steel boom 23 that has its end extending between the upper end of the beams 22 to which the boom 23 is secured by means of the horizontally disposed steel pin 24. The aforesaid boom 23 also extends back outward through the aforesaid beams 17, as one can see by examination of the already-mentioned FIGS. 3 and 4 of the accompanying drawings. A hydraulic cylinder 25 is suitably secured to the top and forward portion of the aforesaid boom 23, the hydraulic cylinder raising and lowering the said boom 23 by means of two rollers 26. These two rollers 26 are secured to a laterally extended axle 27, one to each end. The aforesaid laterally extended axle 27 has its center secured to the outer end of the piston rod 28 of he aforesaid hydraulic cylinder 25. The two aforesaid rollers 26 ride on the diagonal steel beam tracks 29 that have their upper ends secured to the upper portion of the aforesaid beams 17 while the lower ends of the tracks 29 are secured to the top of the previously mentioned horizontally disposed steel beams 15, as one can see by examining the often-mentioned FIGS. 3 and 4 of the accompanying drawings. A second set of rollers 26' are also on the same axles 27 that support the aforesaid rollers 26. The just-mentioned rollers 26' lift the two hardened steel rails 27' that are built into box 28' which is welded to the aforesaid hollow steel boom 23, the aforesaid rollers 26' rotating in the opposite direction from that of rollers 26 in the course of raising and lowering the aforesaid steel boom 23.

Continuing to look at the aforesaid FIG. 4 of the drawings it will be seen that a truck-stabilizing boom 30 has one end swingably secured at 31 to the center of the rear end of this invention. The outer end of the same boom 30 is provided with a laterally disposed beam 32 that has its outer ends provided with downwardly extending U-shaped chain supporting members 33 which chains run free through when one is ready to lift one end of a disabled truck or the like. For reasons of clarity, the chains have been omitted from all of the views of the drawings except FIGS. 1 and 2. This detail will be fully understood by those experienced in the art. It is mentioned at this time that the aforesaid boom 23 has its outer end provided with U-shaped member 34 on which the upper end of said lifting and carrying chains 45 are secured. These chains are used to lift one end of a truck or the like off the ground when it is necessary to tow the truck away for repairs.

Figure 1:
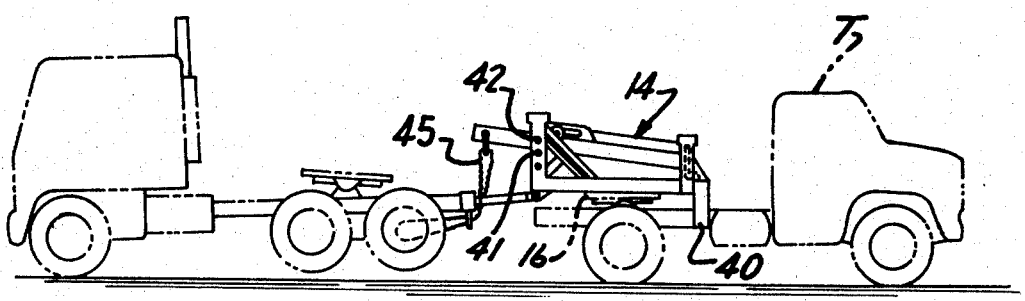
FIG. 1 is a side view of this invention mounted on the fifth wheel of a semi-truck tractor and lifting the rear end of a disabled truck off the ground for movement of the truck to a place of repair.
Figure 2:
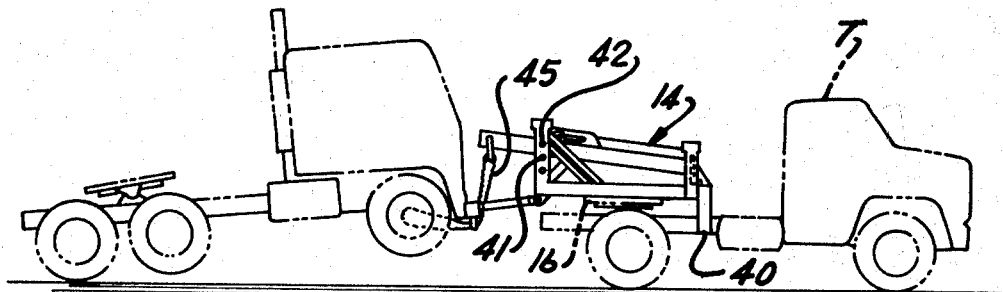
FIG. 2 is similar to that of FIG. 1 except that the broken down truck is being lifted by its front end.

Directing ones attention now to FIG. 7 of the accompanying drawings it will be seen that a cross-beam 35 is located directly under the front end of the aforesaid beams 15 for the purpose of fitting this invention to the aforesaid towing tractor. The towing tractor is indicated in FIGS. 1 and 2 by the reference letter T and its longitudinally disposed beams are indicated in FIG. 7 by the reference number 36. The beams 36 are illustrated in phantom lines in the often-mentioned FIG. 7. The lower end of each aforesaid beam 22 is provided with additional support through the hollow steel boxes 37 which are welded to both the beams 22 and to the aforesaid cross-beams 35. Chains 38 are secured to both the chain binder 39 and to the cross-beam 35 after passing under the beams 36 of the tractor truck T. This invention is also provided with two end plates 40 that extend downwardly, one from each side of the aforesaid cross-beam 35. The purpose of these two rectangular end plates, whose lower ends rest against the sides of the aforesaid beams 36 of the towing tractor T as one can see by examination of the often-mentioned FIGS. 1, 2, and 7, is to prevent side movement of this invention on the towing tractor.

All of the carrying weight in this invention is placed onto the fifth wheel of the towing unit, which makes the load point comparable to that of a loaded semi-trailer which fits the fifth wheel in the same position. This places the axle behind the down push point or fulcrum, the fifth wheel. It is built in the nature of a bridge and ties down to the frame of the towing truck ahead of the fifth wheel. This attachment feature insures much greater lifting capacity and road stability of the unit over any units that are on the market today, which place the weight on the very extreme portion of the frame behind the fifth wheel and behind the axle.

This invention of a truck retriever hoist is designed and built strong enough to be used in towing not only the disabled truck tractor but the loaded semi-trailer attached to it as well, from the breakdown point on any road to an area where it can be towed off the highway where the trailer can then be detached and parked, as towing both the disabled tractor and trailer plus the towing unit is not permissible due to the overall length allowed on the highway.

I have now described the detail construction of this invention of mine with the exception of mentioning that a horizontally disposed pin 41 is placed in suitable openings 42 in the vertically disposed beams 17 after the boom 23 has been raised to its desired position by means of the aforesaid hydraulic cylinder 25. The purpose of this just-mentioned pin 41 is to support the boom 23 and its load while the broken down vehicle is being towed to its place or repair. For reasons of clarity, I have not described each and every one of the structural members of this invention since their purpose will be fully understood by those experienced in the art upon examination of the accompanying drawings. For the same reason, I have not described any of the hydraulic cylinder operating mechanism nor its connecting parts since this too will be understood by those conversant in the art.

Figure 8:
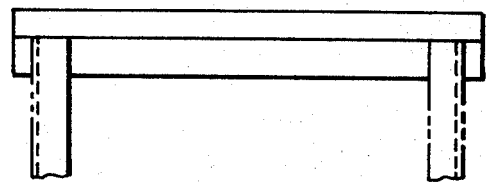
FIG. 8 is a detail of this invention.
Figure 9:
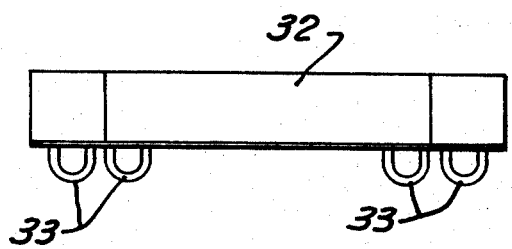
FIG. 9 is a rear view of the snubbing or stabilizing bar of this invention.

The way in which this novel invention is mounted on the towing tractor T will be fully understood from the reading of the first part of the description of this invention, which I feel is unnecessary to repeat here. Obviously, all one has to do to raise or lower the aforesaid boom 23 is to open or close the lever that controls the hydraulic fluid entering or leaving the hydraulic cylinder 25 through hoses 43 and 44. When this is done, the boom 23 will lift or lower the disabled vehicle by means of the chain 45. The end of the just-mentioned vehicle will be held snug against the laterally opposed beams 32 as the hitch point on 23 is spaced one foot inward from the laterally opposed beam which causes a bind between the towing truck and the towed vehicle. U-bolts 33, which the chain passes through, cause the opposed lateral beam 32 to stay firm against the front bumper or the rear frame notches in which case the ends of the rear frame of the truck being towed fits into the notches of the laterally opposed bar 32 as shown in FIG. 8.

This invention is subject to any and all changes in detail design and/or modifications that one may care to make in the same in so long as the changes and/or modifications fall within the scope and intent of the appended claims.

What I now claim as new and desire to secure by Letters Patent is:

1. A truck retriever hoist which consists of a steel structure secured to the fifth wheel of a towing tractor or the like, said structure consisting of a boom that extends out of the rear of said hoist and is provided with means of lifting one end of a disabled truck or the like; said steel structure consisting of two equally spaced, parallel and horizontally disposed steel beams that have vertically disposed steel beams extending upwardly from the rear end thereof and between which slidably and vertically moves the said boom; and said hoist being powered by a hydraulic cylinder located on the top and forward portion of the boom, said hydraulic cylinder being also provided with rollers mounted on the ends of an axle attached at rightangles to its piston rod; and diagonally disposed steel beams which are part of said structure, said steel beams serving as tracks for the said rollers, there being a separate track for each roller, one on each side of said boom, and each of said tracks having its upper end secured to the upper portion of one of said vertically disposed beams and the other end of each of said tracks being secured to the top of the said horizontally disposed steel beams.

2. The invention of claim 1, wherein the two said vertically disposed steel beams are each provided with a plurality of equally spaced and vertically disposed openings therein for the reception of a horizontally disposed pin that is placed in the opening after the first mentioned boom has been raised to its desired height, the said pin being located under the just-mentioned boom for supporting the said boom.

3. The invention of claim 1, wherein the front end of the said steel structure is provided with a rectangular plate on each side thereof that extends downward from the ends of a cross-beam that is located under and secured to the front end of the said horizontally disposed steel beams, the said plates being located on the outside of the longitudinally disposed beams of the said towing tractor or the like, the said plates preventing side movement of the said invention whose front end is also secured by chains to the said beams of the said towing truck.

4. The invention of claim 1, wherein the said hydraulic cylinder is connected by hoses to the hydraulic system of the said towing truck.

* * * * *